United States Patent
Rastogi et al.

(10) Patent No.: US 10,466,356 B2
(45) Date of Patent: Nov. 5, 2019

(54) METHODS AND SYSTEMS OF CUBOIDAL CONTAINER DIMENSION MEASUREMENT WITH TRANSMITTER AND RECEIVER DEVICES

(71) Applicants: Nishith Rastogi, Bengaluru (IN); Shreevar Rastogi, Bengaluru (IN); Prabhav Mehra, Bengaluru (IN); Sudhir Palliyil, Bengaluru (IN); Amitabh Shrivastava, New York, NY (US)

(72) Inventors: Nishith Rastogi, Bengaluru (IN); Shreevar Rastogi, Bengaluru (IN); Prabhav Mehra, Bengaluru (IN); Sudhir Palliyil, Bengaluru (IN); Amitabh Shrivastava, New York, NY (US)

(*) Notice: Subject to any disclaimer, the term of this patent is extended or adjusted under 35 U.S.C. 154(b) by 0 days.

(21) Appl. No.: 15/968,745

(22) Filed: May 1, 2018

(65) Prior Publication Data
US 2019/0033455 A1    Jan. 31, 2019

Related U.S. Application Data

(60) Provisional application No. 62/537,957, filed on Jul. 28, 2017.

(51) Int. Cl.
*G06K 7/10* (2006.01)
*G01S 17/42* (2006.01)
(Continued)

(52) U.S. Cl.
CPC .............. *G01S 17/42* (2013.01); *G01S 7/484* (2013.01); *G01S 7/4808* (2013.01);
(Continued)

(58) Field of Classification Search
CPC ........ G01S 17/42; G01S 7/4808; G01S 7/484; G01S 7/4861; G01S 7/51; G01S 17/88;
(Continued)

(56) References Cited

U.S. PATENT DOCUMENTS

| | | | | |
|---|---|---|---|---|
| 5,923,428 A | * | 7/1999 | Woodworth | G01B 11/04 356/623 |
| 6,177,999 B1 | * | 1/2001 | Wurz | G01B 11/00 356/623 |

(Continued)

*Primary Examiner* — Isiaka O Akanbi

(57) ABSTRACT

A cuboidal container measurement system for cuboidal box dimension measurement, the (CCM) system a transmitter (Tx) unit and a receiver (Rx) unit. The (Tx) unit includes a barcode, a Tx infrared communication system, and an Rx infrared communication system. The system further includes a wireless system, a Tx proximity sensor, a first laser rangefinder system that emits a laser to the Rx unit when the Tx unit is placed on a second edge of the cuboidal box, wherein the first laser rangefinder system measures a distance between the Tx unit and the Rx unit, a second laser rangefinder system that receives the laser from the Tx unit and emits a laser pointing down to the surface supporting the cuboidal box, and an Rx infrared communication system that wirelessly communicates a set of cuboidal box dimensional measurements made by the second laser rangefinder system to the Tx unit.

12 Claims, 6 Drawing Sheets

(51) Int. Cl.
  *G01S 7/48* (2006.01)
  *G01S 7/486* (2006.01)
  *G01S 7/484* (2006.01)
  *G01S 7/51* (2006.01)
  *G01S 17/88* (2006.01)

(52) U.S. Cl.
  CPC .............. *G01S 7/4861* (2013.01); *G01S 7/51* (2013.01); *G01S 17/88* (2013.01); *G06K 7/10722* (2013.01); *G06K 7/10792* (2013.01); *G06K 7/10821* (2013.01)

(58) Field of Classification Search
  CPC ........... G06K 7/10722; G06K 7/10792; G06K 7/10821
  USPC ......................................................... 356/601
  See application file for complete search history.

(56) References Cited

U.S. PATENT DOCUMENTS

| | | | |
|---|---|---|---|
| 6,373,579 B1* | 4/2002 | Ober | G01B 11/002 250/559.38 |
| 7,161,688 B1* | 1/2007 | Bonner | B07C 3/00 356/625 |
| 9,230,142 B2* | 1/2016 | Reynolds | G06K 7/10722 |
| 2002/0117547 A1* | 8/2002 | Krichever | G06K 7/10811 235/462.01 |
| 2008/0156619 A1* | 7/2008 | Patel | G01B 11/0691 198/502.2 |
| 2014/0021259 A1* | 1/2014 | Moed | G06K 9/2027 235/472.01 |
| 2014/0097251 A1* | 4/2014 | Joussen | G06K 7/1404 235/462.07 |
| 2015/0178536 A1* | 6/2015 | Hennick | G06K 7/10732 235/462.22 |

\* cited by examiner

Technical specifications:

Measurement
- Time for length measurement: 100-1000ms
- Accuracy: ± 6mm
- Measurement method: Multiple wavelength interferometry
- QRcode/Barcode scan rate: >50Hz

Storage
- Non-removable SD card storage.
- Stores 100,000+ data points, keeps a rolling backup of all data collected.

Display
- Graphic OLED display
- Displays barcode, measurements, and basic stats for a quick confirmation.

Radio
- Protocol: Bluetooth
- Range: 10meter (unobstructed)

Power
- Time of operation: >10 Hours continuous use.
- Internal battery: Li-Ion, 3.7V
- Charging method: Standard microUSB port, 1A. Charger provided.

Environment
- Operating temp: 0 - 50 degree C
- Storage temp: -20 - 70 degree C
- Relative Humidity: up to 95%, non-condensing
- Ambient light: 5000 Lux max (not usable outside, in bright sunlight)

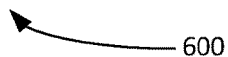
600

METHODS AND SYSTEMS OF CUBOIDAL CONTAINER DIMENSION MEASUREMENT WITH TRANSMITTER AND RECEIVER DEVICES

CLAIM OF PRIORITY AND INCORPORATION BY REFERENCE

This application claims priority from U.S. Provisional Application No. 62/537,957, title METHODS AND SYSTEMS OF CUBOIDAL CONTAINER DIMENSION MEASUREMENT WITH TRANSMITTER AND RECEIVER DEVICES and filed 28 Jul. 2017. This application is hereby incorporated by reference in its entirety for all purposes.

BACKGROUND

1. Field

This application relates CUBOIDAL CONTAINER DIMENSION MEASUREMENT WITH TRANSMITTER AND RECEIVER DEVICES.

2. Related Art

Consumers have increasingly migrated from retail shopping in physical stores to online retail shopping. Consequently, the number of goods being shipped in boxes has increased drastically. As a result, the number of box deliveries via delivery trucks and vans have increased. Efficiently packing boxes into delivery vehicles is important to the logistics of delivery companies. Providing the delivery company box with the dimensions of boxes can help the delivery company efficiently pack the delivery vehicles. This information can also be digitized and enable computer programs to automate and scale instructions for efficient box packing.

BRIEF SUMMARY OF THE INVENTION

In one aspect, a cuboidal container measurement (CCM) system for cuboidal box dimension measurement with a transmitter (Tx) unit and a receiver (Rx) unit comprising: a Tx unit, wherein the Tx unit comprises: a barcode reader system that reads a bar code on the cuboidal box, a Tx infrared communication system that communicates with infrared signals to an Rx infrared communication system in the Rx unit and receives a set of cuboidal measurements made by the Rx unit from the Rx unit and receives a signal from the Rx unit that the Rx unit has been placed on a first edge of a cuboidal box; a wireless system that communicates other wirelessly networked computer devices, a Tx proximity sensor that detects when the Tx unit is placed on a first edge of the cuboidal box, a first laser rangefinder system that emits a laser to the Rx unit when the Tx unit is placed on a second edge of the cuboidal box, wherein the first laser rangefinder system measures a distance between the Tx unit and the Rx unit; an Rx unit, wherein the Rx unit comprises: an Rx proximity sensor that detects when the Rx unit is placed on the second edge of the cuboidal box, a second laser rangefinder system that receives the laser from the Tx unit and emits a laser pointing down to the surface supporting the cuboidal box, and an Rx infrared communication system that wirelessly communicates a set of cuboidal box dimensional measurements made by the second laser rangefinder system to the Tx unit.

BRIEF DESCRIPTION OF THE DRAWINGS

FIG. 6 illustrates an example of a screen shot 1400 of various specifications that can be used to implement a CCM system, according to some embodiments.

Figure 1:
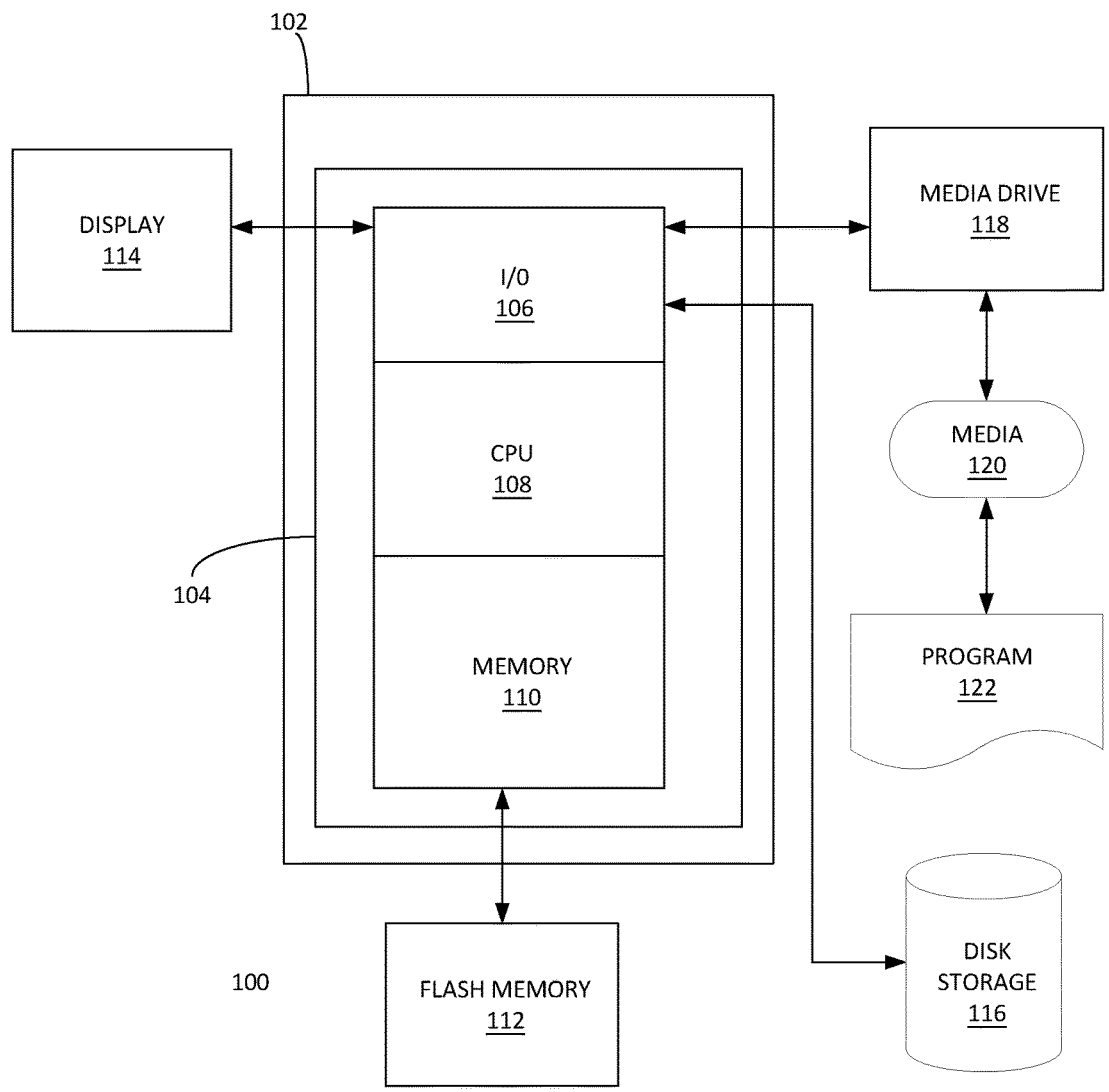
FIG. 1 depicts an exemplary computing system that can be configured to perform any one of the processes provided herein.

The Figures described above are a representative set, and are not an exhaustive with respect to embodying the invention.

DESCRIPTION

Disclosed are a system, method, and article of manufacture for methods and systems of cuboidal container dimension measurement with transmitter and receiver devices. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Accelerometer is a device that measures proper acceleration. Proper acceleration, being the acceleration (or rate of change of velocity) of a body in its own instantaneous rest frame.

Application programming interface (API) can specify how software components of various systems interact with each other.

Battery meter a device which gives information about a battery.

Dongle can be a small piece of hardware that connects to another device to provide it with additional functionality.

General-purpose input/output (GPIO) is a generic pin on an integrated circuit or computer board whose behavior, including whether it is an input or output pin, is controllable by the user at run time.

I²C (Inter-integrated Circuit) is a multi-master, multi-slave, packet switched, single-ended, serial computer bus.

Haptic technology can interface with a user through the sense of touch.

Infrared radiation (IR) is electromagnetic radiation (EMR) with longer wavelengths than those of visible light that extends from the nominal red edge of the visible spectrum at 700 nanometers (frequency 430 THz), to 1000000 nm (300 GHz). Example devices herein can use the infrared electromagnetic spectrum for wireless communications.

Laser rangefinder is a rangefinder which uses a laser beam to determine the distance to an object.

Microcontroller can be a small computer on a single integrated circuit.

Proximity sensor detects the distance between itself and a nearby object in some form. It can be used to detect when the Tx or Rx unit is placed on the edge of a box by using two or more orthogonally placed such sensors.

QR code (e.g. Quick Response Code) is a type of matrix barcode (or two-dimensional barcode). A barcode can be a machine-readable optical label that contains information about the item to which it is attached. In the case of a QR code, four standardized encoding modes (numeric, alphanumeric, byte/binary, and kanji) can be used to efficiently store data.

Real-time clock (RTC) can be a clock that keeps civil time for a computer.

Serial communication, the process of sending data one bit at a time, sequentially, over a communication channel or computer bus.

Secure Digital (SD) is a non-volatile memory card format.

Stock keeping unit (SKU) can be a unique identifier for each distinct product and service that can be purchased in business.

Serial Peripheral Interface (SPI) is an interface bus commonly used to send data between microcontrollers and small peripherals such as sensors, displays, and SD cards.

An example cuboidal container measurement (CCM) system for container dimension measurement with transmitter (Tx) and receiver (Rx) devices, according to some embodiments. Cuboidal container dimension measurement with transmitter and receiver devices provides a quick and easy way to measure and catalogue dimensions of cuboidal boxes (and/or other similar types of containers). CCM system 100 can incorporate a barcode reader to reference the dimensions of SKU's by barcode. CCM system 100 can include two handheld wireless units and a universal serial bus (USB) dongle (e.g. utilizes plug and play technology). The dongle can act as a receiver and transfers the data from the CCM system 100 measurement units to another computer system. The Tx unit and Rx unit can fit together and are switched on when separated.

The Rx unit and the Tx unit can inter connect to fit into each other and are automatically switched on when separated. For example, a user can separate the two units and then scans the barcode of a cuboidal box with the Tx unit. The two units then are set to a cuboidal-box dimension measurement mode. The user can place both the Rx and Tx units on the edge of the box opposite to each other. As soon as the Tx unit is placed on the edge of the cuboidal box, a laser beam is emitted towards the left, where the Rx unit is placed. The laser from the Tx unit is detected via a translucent window in the Rx unit. The Rx unit also emits a laser pointing down. The laser hits the floor beneath the cuboidal box. The Rx and Tx units then perform the first measurement of length and height. The user is alerted when the measurement is completed (e.g. via a double beep through audio alert, haptic feedback, a change in color of an indicator LED, etc.). The user then places the handheld units on the orthogonal edges of the cuboidal box to record the breadth measurement. The measurements are stored in a local computer memory in CCM system. The measurements can be displayed on OLED in the Tx unit. CCM system can communicate the measurements to another computer system (e.g. by pressing the synchronize button when close to the dongle connected to a PC, etc.). To switch off CCM system, the Rx and Tx units are brought together. The Rx and Tx units can attach magnetically.

FIG. 1 depicts an exemplary computing system 100 that can be configured to perform any one of the processes provided herein. In this context, computing system 100 may include, for example, a processor, memory, storage, and I/O devices (e.g., monitor, keyboard, disk drive, Internet connection, etc.). However, computing system 100 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 1 depicts computing system 100 with a number of components that may be used to perform any of the processes described herein. The main system 102 includes a motherboard 104 having an I/O section 106, one or more central processing units (CPU) 108, and a memory section 110, which may have a flash memory card 112 related to it. The I/O section 106 can be connected to a display 114, a keyboard and/or other user input (not shown), a disk storage unit 116, and a media drive unit 118. The media drive unit 118 can read/write a computer-readable medium 120, which can contain programs 122 and/or data. Computing system 100 can include a web browser. Moreover, it is noted that computing system 100 can be configured to include additional systems in order to fulfill various functionalities. Computing system 100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 2:
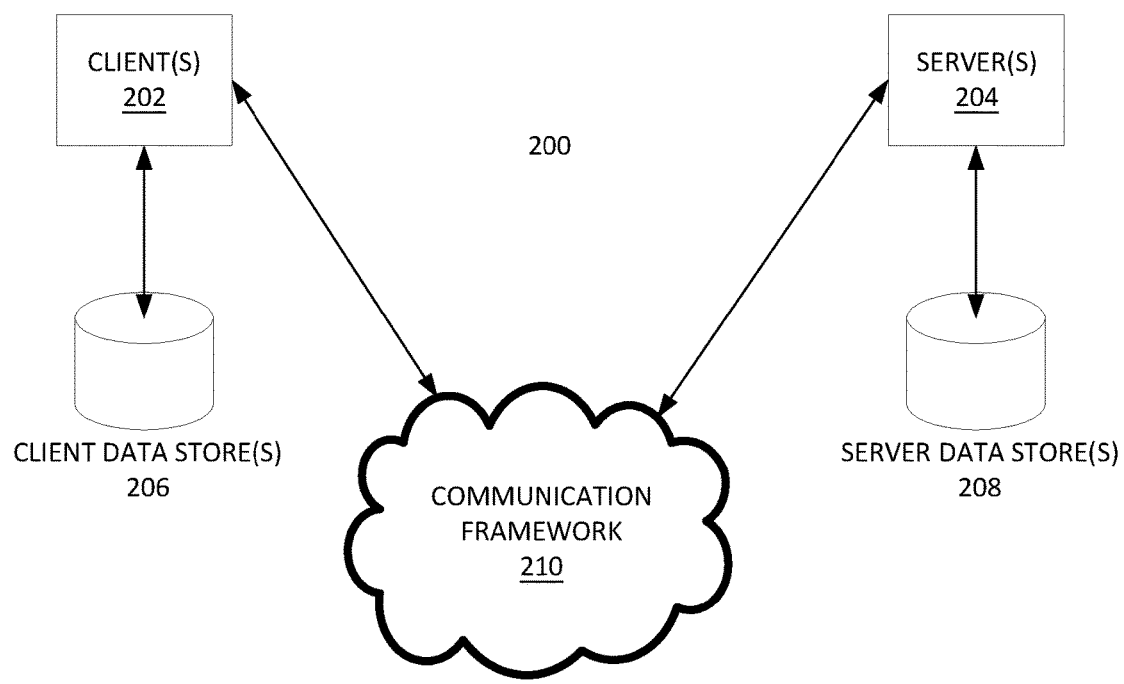
FIG. 2 is a block diagram of a sample computing environment that can be utilized to implement various embodiments.

FIG. 2 is a block diagram of a sample computing environment 200 that can be utilized to implement various embodiments. The system 200 further illustrates a system that includes one or more client(s) 202. The client(s) 202 can be hardware and/or software (e.g., threads, processes, computing devices). The system 200 also includes one or more server(s) 204. The server(s) 204 can also be hardware and/or software (e.g., threads, processes, computing devices). One possible communication between a client 202 and a server 204 may be in the form of a data packet adapted to be transmitted between two or more computer processes. The system 200 includes an orchestration framework 210 that can be employed to facilitate communications between the client(s) 202 and the server(s) 204. The client(s) 202 are connected to one or more client data store(s) 206 that can be employed to store information local to the client(s) 202. Similarly, the server(s) 204 are connected to one or more server data store(s) 208 that can be employed to store information local to the server(s) 204. In some embodiments, system 200 can instead be a collection of remote computing services constituting a cloud-computing platform.

Figure 3:
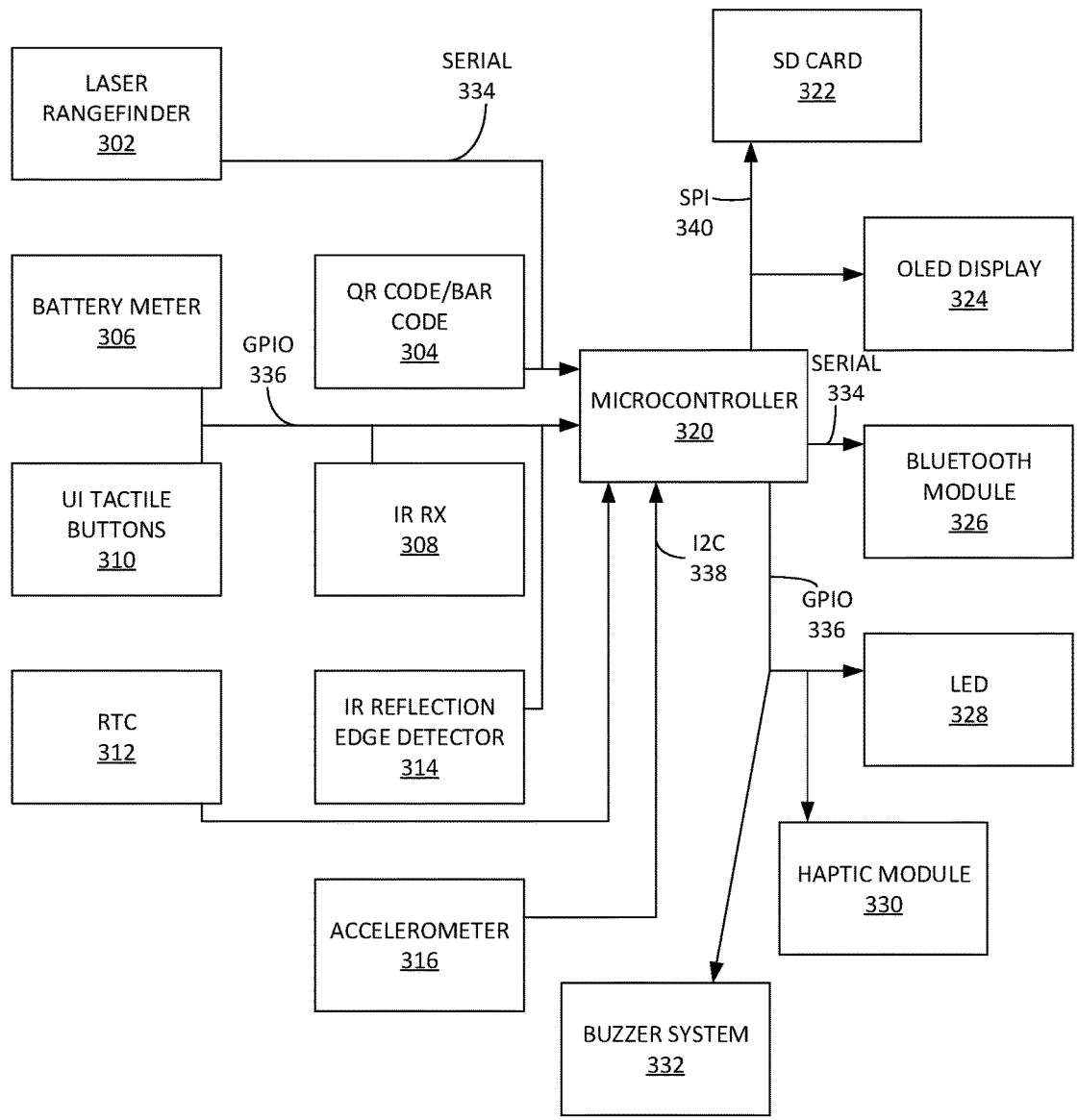
FIG. 3 illustrates an example of a Tx unit, according to some embodiments.
Figure 4:
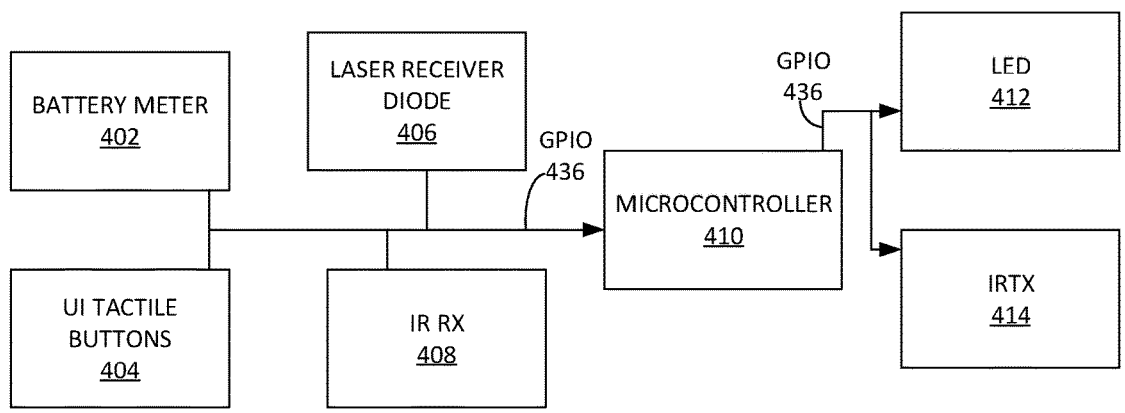
FIG. 4 illustrates an example of a Rx unit, according to some embodiments.

FIGS. 3 and 4 illustrate various components of Tx unit 300 and Rx unit 400 of CCM system. Both Tx unit 300 and Rx unit 500 include a microcontroller system. In both FIGS. 3 and 5, the boxes to the left of the microcontroller system are forms of input from the user or sensors and the boxes on the right of the microcontroller system are outputs. More specifically, FIG. 3 illustrates an example of a Tx unit 300, according to some embodiments. Tx unit 300 can include a laser rangefinder 302. Laser rangefinder 302 can communicate with microcontroller 320 via serial interface 334. QR code/bar code 304 can read QR codes and bar codes. Battery meter 306 can provide an indicator of current battery use and/or remaining power. UI tactile buttons 310 can be used for input into microcontroller 320. IR Rx 308 can be used to communicate information between the Rx and Tx units. GPIO 336 can be a generic pin on an integrated circuit or computer board whose behavior, including whether it is an input or output pin, is controllable by the user at run time. RTC 312 can be a local clock system. Proximity sensor 314 (e.g. an IR reflection edge detector) an be used to detect when the Tx unit is placed on the edge of a box. Accelerometer 316 can provide position and motion information for Tx unit 300. I²C 338 can be a multi-master, multi-slave, packet switched, single-ended, serial computer bus. Microcontroller 320 can be a small computer on a single integrated circuit used to implement the functionalities of Tx unit 300 (e.g. processes provided infra, QR/bar code reading, calculator, etc.). SD card 322 can provide local memory. SPI 340 can transfer data between various systems of Tx unit 300. OLED display 324 can be used to visually communicate specified information to a user. Bluetooth® module 326 can include various systems for local wireless communication between Tx unit 300 and other computing systems. Serial 334 can communicate data to and/or from microcontroller 320. LED 328 can provide visual information to a user via an LED. Haptic module 330 can provide a user haptic feedback. Buzzer system 332 can provide audio feedback.

FIG. 4 illustrates an example of a Rx unit 400, according to some embodiments. Battery meter 402 can provide an indicator of current battery use and/or remaining power. UI tactile buttons 404 can be used for input into microcontroller 320. Laser receiver diode 406 can be used to communicate information between Rx and Tx units, including information of the state of Tx unit and its position in relation to the Rx unit. Proximity sensor 408 (e.g. IR Rx) can be used to detect when the Rx unit is placed on the edge of a box. Microcontroller 410 can be a small computer on a single integrated circuit used to implement the functionalities of Rx unit 400. LED 412 can provide visual information to a user via an LED. IR Tx 414 can be used to communicate information to the Tx unit e.g. to acknowledge receipt of some information. GPIO 436 and 336 can be a generic pin on an integrated circuit or computer board whose behavior, including whether it is an input or output pin, is controllable by the user at run time.

Example Processes

In one example embodiment, the Tx and Rx units can be switched on by separating them. The separation can activate a magnetic reed switch and closes the power circuit. Initially LT and LR can both be green, and the OT displays the previously measured data. It is noted that In this default state, both the Rx and Tx units are waiting for input from the user in the form of a button press or being placed on a box. The Rx unit detects if it is placed on the box by ER. If ER falls to register the box, it can be manually overridden by BR. Similarly, the Tx unit detects when it is placed on the box by ET1, ET2 and ET3. All three can be activated to register being placed on a box. Similar to the Rx unit, these can be manually overridden by pressing BT4.

QT measurement is activated by pressing BT1. Whereupon QT sends a serial signal to UT containing the barcode or QR code detected. UT then starts a new measurement and stores the data in ST and displays the barcode in OT. ZT and HT give a single beep. LT now turns purple. At this time, dimensions of the box are unknown and are represented in OT as NA. The user then places Rx and Tx on a box. LR and LT turn yellow. ZT and HT give a double beep. The laser beam from LT1 should strike WR so that PR can detect it. When the beam is detected, UR sends a signal to TR which is received by RT. UT then starts the measurement for length and height by sending a serial signal to LT1 and LT2 respectively. The user also ensures that laser beam from LT2 strikes the bottom of the surface where the box is kept. When the measurements are completed, LT1 and LT2 respond back with a serial signal containing the measured dimensions. Depending on the accuracy of the measurements, UT can take multiple measurements. The dimensions are stored in ST and displayed in OT. UT then switches off LT1 and LT2. At this point breadth is still NA. LT turns white. ZT and HT give a triple beep. The user then lifts both Rx and Tx units off of the edge of the box. LT turns blue and LR turns green. The user then places the Rx and Tx units on the orthogonal edges as shown. LT and LR turn yellow. ZT and HT provide a double beep. UT pulses LT1 which is then detected by PR. UR then pulses TR which is detected by RT. UT then starts the breadth measurement via LT1. When the measurement is completed LT turns green. ZT and HT provide a triple beep. The data is stored in ST and displayed in OT. A timestamp is also added via CT. When RX and Tx units are lifted off of the box, they return to the initial state as if they were just switched on.

In the initial state, if BT2 is pressed, UT switches on BT and waits to connect to a dongle. If no dongle is in range or the connection fails, OT displays a failure message and after some delay Rx returns to initial state. If the dongle is connected, the data stored in ST since last synchronization operation is transmitted via Bluetooth (BT) to the dongle where it is typed out into a text input software (e.g. Excel®, etc.). Each data packet can include the time of measurement, barcode data, the three dimensions, etc.

Figure 5:
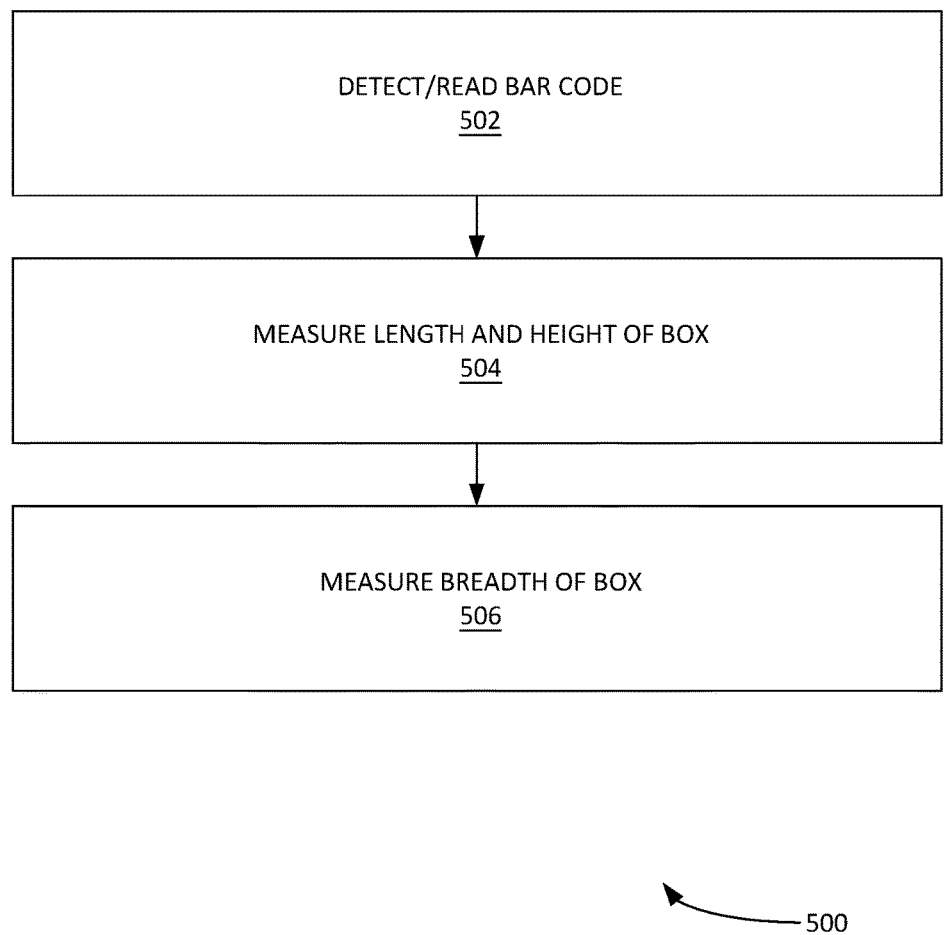
FIG. 5 illustrates an example process of measuring a box's dimensions with a CCM system, according to some embodiments.

More specifically, FIG. 5 illustrates an example process of measuring a box's dimensions with a CCM system, according to some embodiments. In step 502, process 500 can detect/read bar code. In step 504, process 500 can measure length and height of box. In step 506, process 500 can measure breadth of box. It is noted that process 500 can measure the dimensions of other cuboidal containers than boxes in other example embodiments.

FIG. 6 illustrates an example of a screen shot 600 of various specifications that can be used to implement a CCM system, according to some embodiments.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A cuboidal container measurement (CCM) system for cuboidal box dimension measurement, the (CCM) system includes a transmitter (Tx) unit and a receiver (Rx) unit:
   wherein the Tx unit comprises:
   a barcode reader system that reads a bar code on the cuboidal box,
   a Tx infrared communication system that communicates with infrared signals to an Rx infrared communication system in the Rx unit and receives a set of cuboidal measurements made by the Rx unit from the Rx unit and receives a signal from the Rx unit that the Rx unit has been placed on a first edge of a cuboidal box;
   a magnetic attachment for fitting together the Tx unit and the Rx unit, wherein the Tx unit and the Rx unit switches to an on mode when the magnetic attachment that fits the Tx unit and the Rx unit together is separated;
   a wireless system configured to communicate with other wirelessly networked computer devices,
   a Tx proximity sensor that detects when the Tx unit is placed on a first edge of the cuboidal box,
   a first laser rangefinder system that emits a laser to the Rx unit when the Tx unit is placed on a second edge of the cuboidal box, wherein the first laser rangefinder system measures a distance between the Tx unit and the Rx unit;
   an Rx unit, wherein the Rx unit comprises:
   an Rx proximity sensor that detects when the Rx unit is placed on the second edge of the cuboidal box,
   a second laser rangefinder system that receives the laser from the Tx unit and emits a laser pointing down to the surface supporting the cuboidal box, and
   an Rx infrared communication system that wirelessly communicates a set of cuboidal box dimensional measurements made by the second laser rangefinder system to the Tx unit.

2. The CCM system of claim 1, wherein the Tx unit notifies a user when the set of cuboidal box dimensional measurements are completed and received by the Tx unit.

3. The CCM system of claim 2, wherein Tx unit emits an audible beep when the set of cuboidal box dimensional measurements are completed and received by the Tx unit.

4. The CCM system of claim 1, wherein the bar code reader further comprises a QR code reading system.

5. The CCM system of claim 1, wherein the second edge of the cuboidal box where the Tx unit is placed to the left of the first edge of the cuboidal box where the Rx unit is placed.

6. The CCM system of claim 1, wherein first laser rangefinder system that emits a laser to the Rx unit when the Tx unit detects that the Rx sensor is placed on the first edge of the cuboidal box.

7. The CCM system of claim 1, wherein the Tx proximity sensory comprises a first IR reflection edge detector in the Tx unit.

8. The CCM system of claim 1, wherein the Rx proximity sensory comprises a second IR reflection edge detector in the Rx unit.

9. The CCM system of claim 1, wherein the Tx unit comprises an OLED display, and wherein the OLED display displays the set of cuboidal box dimensional measurements.

10. The CCM system of claim 1, wherein the set of cuboidal box dimensional measurements further comprises a dimensional measurement from the first laser rangefinder system.

11. The CCM system of claim 10, wherein the wireless system that communicates the set of cuboidal box dimensional measurements to the other wirelessly networked computer devices.

12. The CCM system of claim 11, wherein the wherein the Tx unit and the Rx unit switches to an off mode when the magnetic attachment that fits the Tx unit and the Rx unit together is reattached.

* * * * *